(12) United States Patent
Staring et al.

(10) Patent No.: US 12,537,397 B2
(45) Date of Patent: Jan. 27, 2026

(54) WIRELESS POWER TRANSFER

(71) Applicant: KONINKLIJKE PHILIPS N.V., Eindhoven (NL)

(72) Inventors: Antonius Adriaan Maria Staring, Eindhoven (NL); Aleksei Agafonov, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 18/866,215

(22) PCT Filed: May 8, 2023

(86) PCT No.: PCT/EP2023/062075
§ 371 (c)(1),
(2) Date: Nov. 15, 2024

(87) PCT Pub. No.: WO2023/222419
PCT Pub. Date: Nov. 23, 2023

(65) Prior Publication Data
US 2025/0323533 A1 Oct. 16, 2025

(30) Foreign Application Priority Data
May 17, 2022 (EP) .................................... 22173919

(51) Int. Cl.
*H02J 50/80* (2016.01)
*H02J 50/12* (2016.01)

(52) U.S. Cl.
CPC .............. *H02J 50/80* (2016.02); *H02J 50/12* (2016.02)

(58) Field of Classification Search
CPC .................................. H02J 50/80; H02J 50/12
See application file for complete search history.

(56) References Cited

U.S. PATENT DOCUMENTS

| 10,886,782 B2 * | 1/2021 | Ettes | H04B 5/266 |
| 11,916,403 B2 * | 2/2024 | Agafonov | H02J 50/80 |
| 11,979,034 B2 * | 5/2024 | Draak | H02J 50/60 |

(Continued)

OTHER PUBLICATIONS

International Search Report and Written Opinion from PCT/EP2023/062075 dated Jul. 27, 2023.

*Primary Examiner* — Rexford N Barnie
*Assistant Examiner* — Michael J Warmflash

(57) ABSTRACT

A power receiver (105) comprises an input circuit (107, 503) with a receiver coil (107) extracting power from a power transfer signal generated by a power transmitter (101). A variable load (511) applies a modulation loading to the input circuit (107, 503) and a data transmitter (509) transmit data symbols to the power transmitter (101) by load modulating the power transfer signal during communication time intervals interspersed by non-communication time intervals during which no data symbols are transmitted. The data symbols are represented by modulation loading patterns and the data transmitter (509) is arranged to control the variable load (511) to repeatedly change the modulation loading during non-communication time intervals. The approach may provide improved communication and power transfer operation, and may in particular reduce transients, e.g. in the supply voltage provided to a load of the power receiver (105).

23 Claims, 15 Drawing Sheets

(56) References Cited

U.S. PATENT DOCUMENTS

| | | | |
|---|---|---|---|
| 2005/0165461 A1* | 7/2005 | Takeda | H02J 50/12 607/61 |
| 2008/0185980 A1* | 8/2008 | Van Casteren | H05B 41/2883 315/307 |
| 2013/0147279 A1* | 6/2013 | Muratov | H02J 7/00036 307/104 |
| 2013/0235632 A1* | 9/2013 | Knoedgen | H02M 3/33592 363/126 |
| 2016/0087691 A1* | 3/2016 | Van Wageningen | H02J 50/80 307/104 |
| 2016/0156232 A1* | 6/2016 | Joye | H04B 5/24 307/104 |
| 2016/0218569 A1* | 7/2016 | Porat | H02J 50/12 |
| 2017/0170686 A1* | 6/2017 | Van Wageningen | H02J 50/60 |
| 2018/0109246 A1* | 4/2018 | Zaplana | H03B 5/1265 |
| 2018/0159352 A1* | 6/2018 | Pan | H02J 50/90 |
| 2020/0212725 A1* | 7/2020 | Van Wageningen | H02J 50/12 |
| 2020/0280220 A1* | 9/2020 | Ettes | H02J 50/12 |
| 2021/0320535 A1* | 10/2021 | Draak | H02J 50/12 |
| 2023/0017317 A1* | 1/2023 | Ettes | H02J 7/00308 |
| 2025/0070599 A1* | 2/2025 | Draak | H02J 50/12 |

\* cited by examiner

101

WIRELESS POWER TRANSFER

CROSS-REFERENCE TO PRIOR APPLICATIONS

This application is the U.S. National Phase application under 35 U.S.C. § 371 of International Application No. PCT/EP2023/062075, filed on May 8, 2023, which claims the benefit of EP Patent Application No. EP 22189158.3, filed on Aug. 7, 2022 and EP Patent Application No. EP 22173919.6, filed on May 17, 2022. These applications are hereby incorporated by reference herein.

FIELD OF THE INVENTION

The invention relates to wireless power transfer and in particular, but not exclusively, to communication in a power transfer system such as the Qi or Ki wireless power transfer Specifications.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index.html, where in particular the defined Specification documents can be found.

Based on the Qi Specification, an approach known as the Ki specification is being developed for high power applications, such as specifically for Kitchen appliances.

In order to support efficient wireless power transfer, wireless power transfer systems, such as Qi based systems, utilize substantial communication between the power transmitter and the power receiver. Initially, Qi supported only communication from the power receiver to the power transmitter using load modulation of the power transfer signal. Thus, initial Qi devices support only unidirectional communication from the power receiver to the power transmitter.

US2013/147279A1 and US 2013/0235632A1 discloses a wireless power transfer system employing communication between the power transmitter and power receiver based on load modulation.

However, developments of the standard have introduced bidirectional communication and many functions are supported by communication exchanges between the power receiver and the power transmitter. In many systems, the communication from the power transmitter to the power receiver is accomplished by modulating the power transfer signal.

In some systems, it has been proposed to use separate and dedicated communication functionality such as e.g. Bluetooth or NFC (Near Field Communication) based communication. However, whereas such approaches may tend to provide efficient operation in many scenarios it is also associated with a number of disadvantages, including requiring dedicated and complex communication circuitry and potentially a reduced certainty that the power transmitter is indeed communicating with the power receiver that is being supplied with power. Also, backwards compatibility, e.g. with Qi based devices, may be problematic for newer devices based on separate communication.

Communicating using load modulation of the power transfer signal transferring power to the power receiver may however also tend to have some associated disadvantages. For example, the load modulation may tend to introduce some electrical noise including both noise to the signals of the devices as well as radiated electromagnetic noise. The load modulation may increase electromagnetic interference to other devices and maintaining sufficient or optimal electromagnetic compatibility has been found to be challenging.

It has also been found in practice that load modulation may result in the introduction of undesired spurious oscillations to the drive signal and the power transfer signal. The power transfer path in a wireless power transfer system tends to include a significant amount of inductance and tends to have a resonant behavior. As such load modulation tends to affect the power transfer path and indeed the communication path. Thus, the load modulation also results in noise and interference to the communication itself (self interference). This differs substantially from other communication systems where random noise or interference from other transmissions are the main causes of bit errors.

Another disadvantage is that the load modulation of the power transfer signal may result in acoustic noise. Such noise may result from the impact on mechanical elements of the variations to the electromagnetic field caused by the load modulation, and specifically it may cause mechanical elements to move and vibrate resulting in potential acoustic noise being generated.

In some cases, load modulation communication as e.g. used in the initial versions of the Qi Specifications may not have perfect reliability and some bit errors may possibly occur in some cases. For example, high levels of noise or self-interference may result in bit errors and/or may require an increased modulation depth which may result in increased electrical or acoustic noise resulting from the load modulation.

Load modulation may also potentially have an effect on the power transfer operation and may in particular affect the operating point for the power transfer. This may result in undesirable variations in the power transfer operation and performance.

Although it may in some ways be desired to change to a different communication approach, maintaining backwards compatibility or reducing the amount of change needed for existing designs and approaches is a prime challenge that often renders this unattractive.

Hence, an improved approach would be advantageous, in particular, an improved approach for load modulation allowing increased flexibility, reduced cost, reduced complexity, improved power transfer operation, increased reliability, reduced communication errors, improved backwards compatibility, improved electromagnetic compatibility, reduced electrical and/or acoustic noise, improved communication, a more stable power transfer, reduced power transfer variations, increased stability, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention, there is provided a power receiver for wirelessly receiving power from a power transmitter via an electromagnetic power transfer signal, the power receiver comprising: an input circuit comprising a receiver coil arranged to extract power from the power transfer signal; a variable load coupled to the input circuit and arranged to apply a modulation loading to the input circuit; a data transmitter being arranged to transmit data symbols to the power transmitter by load modulating the power transfer signal during communication time intervals that are interspersed by non-communication time intervals during which no data symbols are transmitted by the data transmitter; the data transmitter further being arranged to vary the variable load to apply a modulation loading pattern for each data symbol transmitted during the communication time intervals, each possible data symbol value being represented by a different modulation loading pattern for the modulation loading; and the data transmitter is arranged to control the variable load to repeatedly change the modulation loading during non-communication time intervals; wherein the data transmitter is arranged to control the variable load to apply a repeating loading variation pattern during the non-communication time intervals, a maximum absolute difference between a cross-correlation of the repeating loading variation pattern and the modulation sequence data sequences and a reference correlation is no more than 50% of a maximum absolute difference between an auto-correlation of the modulation sequence data sequences and the reference correlation, the reference correlation being an average correlation between the modulation sequence data sequences and a random sequence.

The invention may allow improved performance in many embodiments and may in particular in many embodiments allow improved communication between a power receiver and a power transmitter. The approach may allow, facilitate, or enable improved power transfer in many embodiments.

The approach may in many scenarios allow a reduced impact of load modulation on the power transfer performance and operation. In many embodiments, reduced variation in the properties and operation of the input circuit in extracting power from the power transfer signal may be achieved. A more constant operation may be achieved in many embodiments. A reduced voltage variation for the load being supplied by the power receiver may be achieved in many scenarios.

During the non-communication time intervals, there may be no communication of information data from the power receiver to the power transmitter. In some embodiments, the data transmitter may be arranged to control the variable load during non-communication time intervals so that the resulting modulation loading does not match any modulation loading pattern that represents a possible data symbol value.

During the communication time intervals, the data transmitter 509 may be arranged to vary the variable load such that the modulation loading pattern represent a data symbol value for the data symbol. Each possible data symbol value may be represented by/linked with one modulation loading pattern with the modulation loading patterns being different for different data symbol values. The data transmitter may be arranged to transmit a first symbol value by controlling the variable load to apply the modulation loading pattern linked with the first symbol value.

The modulation loading is determined by the load value of the variable load. The variable load may be a modulation load with the load modulation being applied to the power transfer signal by the variations in the variable load. The modulation loading may be the (part of the) loading of the power transfer signal that is varied in response to the data symbols being transmitted.

Each communication time interval may correspond to a time interval during which a data packet is transmitted from the power receiver to the power transmitter. Each non-communication time interval may correspond to a time interval between the communication time intervals. Each non-communication time interval may correspond to a time interval during which no data packet is transmitted from the power receiver to the power transmitter.

According to an optional feature of the invention, the data transmitter is arranged to control the variable load to repeatedly change the modulation loading during non-communication time intervals such that a difference between an average modulation loading during the non-communication time intervals and an average modulation loading during the non-communication time intervals differs by less than 10% of a maximum modulation loading change during the communication time intervals.

This may provide improved performance in many embodiments. It may in many scenarios ensure a low voltage variation of the induced signal and the supply voltage to the load. The approach may reduce, mitigate, or in some cases substantially remove transient effects in properties or operating points occurring at the start of communication time intervals.

In some embodiments, load changes during non-communication time intervals may be such that an average modulation loading during non-communication time intervals is the same as an average modulation loading during communication time intervals. In some embodiments, a difference between the averages may vary by no more than 2%, 5%, 20% of the maximum modulation loading during a communication time interval.

According to an optional feature of the invention, the data transmitter is arranged to control the variable load to repeatedly change the modulation loading during non-communication time intervals such that an average time between modulation loading changes during the non-communication time interval is no less than 50% of an average time between modulation loading changes during the non-communication time interval.

This may provide improved performance in many embodiments. It may in many scenarios provide reduced voltage variation of the induced signal and of the supply voltage to the load.

In some embodiments, an average time interval between load changes during the non-communication time intervals is the same as an average time interval between load changes during the communication time intervals.

In some embodiments, a minimum time interval between load changes during the non-communication time intervals is the same as a minimum time interval between load changes during the communication time intervals.

According to an optional feature of the invention, t the modulation loading pattern for each possible data symbol value comprises at least two different loading values.

This may allow improved performance in many embodiments.

According to an optional feature of the invention, the modulation loading pattern for each possible data symbol value comprises a load modulation chip sequence of at least five load modulation chips.

This may allow improved performance in many embodiments.

According to an optional feature of the invention, the data transmitter is arranged to repeatedly change the modulation loading during non-communication time intervals such as to not include a modulation loading pattern corresponding to any load modulation chip sequence.

This may allow improved performance in many embodiments.

The feature may allow improved communication, and in many embodiments may allow improved trade-off between different parameters and operating characteristics. The approach may e.g. allow highly reliable communication yet allow reduced modulation depth to be used. The approach may reduce electric noise (such as modulation switching noise) and/or electromagnetic interference and allow improved electromagnetic compatibility. The approach may in many cases reduce or prevent acoustic noise. It may in many embodiments reduce voltage variations for the load supply voltage during communication time intervals and/or non-communication time intervals.

A chip sequence may be a sequence/pattern of chip values. Each chip value may be represented by a load modulation level or pattern of such. Chip sequences for different data symbols have different sequences/patterns of chip values.

In many embodiments, the length of the chip sequences is not below 5 and not above 1024 chips.

According to an optional feature of the invention, each chip of the load modulation chip sequence is represented by a modulation loading transition.

This may allow improved performance in many embodiments.

According to an optional feature of the invention, a number of modulation loading changes during a load modulation chip sequence duration in the non-communication time intervals is no less than a maximum number of modulation loading changes in the load modulation chip sequences.

This may allow improved performance in many embodiments.

The data transmitter is arranged to control the variable load to apply a repeating loading variation pattern during the non-communication time intervals.

This may allow improved performance in many embodiments.

According to an optional feature of the invention, the repeating loading variation pattern is a periodically alternation between two modulation loadings.

This may allow improved performance in many embodiments.

A maximum absolute difference between a cross-correlation of the repeating loading variation pattern and the modulation sequence data sequences and a reference correlation is no more than 50% of a maximum absolute difference between an auto-correlation of the modulation sequence data sequences and the reference correlation, the reference correlation being an average correlation between the modulation sequence data sequences and a random sequence.

This may allow improved performance in many embodiments.

According to an optional feature of the invention, the data transmitter is arranged to control the variable load to not include any modulation loading pattern representing a data symbol during non-communication time intervals.

This may allow improved performance in many embodiments.

According to an optional feature of the invention, the data transmitter is arranged to switch the variable load between two modulation loading values.

This may allow improved performance in many embodiments.

According to an optional feature of the invention, there is provided claim 14.

According to an aspect of the invention there is provided a method of operation for a power receiver wirelessly receiving power from a power transmitter via an electromagnetic power transfer signal, the method comprising: an input circuit comprising a receiver coil extracting power from the power transfer signal; a variable load coupled to the input circuit applying a modulation loading to the input circuit; a data transmitter transmitting data symbols to the power transmitter by load modulating the power transfer signal during communication time intervals that are interspersed by non-communication time intervals during which no data symbols are transmitted by the data transmitter; the method further comprising: varying the variable load to apply a modulation loading pattern for each data symbol transmitted during the communication time intervals, each possible data symbol value being represented by a different modulation loading pattern for the modulation loading; and controlling the variable load to repeatedly change the modulation loading during non-communication time intervals; wherein the data transmitter controls the variable load to apply a repeating loading variation pattern during the non-communication time intervals, a maximum absolute difference between a cross-correlation of the repeating loading variation pattern and the modulation sequence data sequences and a reference correlation is no more than 50% of a maximum absolute difference between an auto-correlation of the modulation sequence data sequences and the reference correlation, the reference correlation being an average correlation between the modulation sequence data sequences and a random sequence.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to a high power wireless power transfer system utilizing a power transfer approach such as known from the Qi Specification or the Ki Specification. However, it will be appreciated that the invention is not limited to this application but may be applied to many other wireless power transfer systems.

Figure 1:
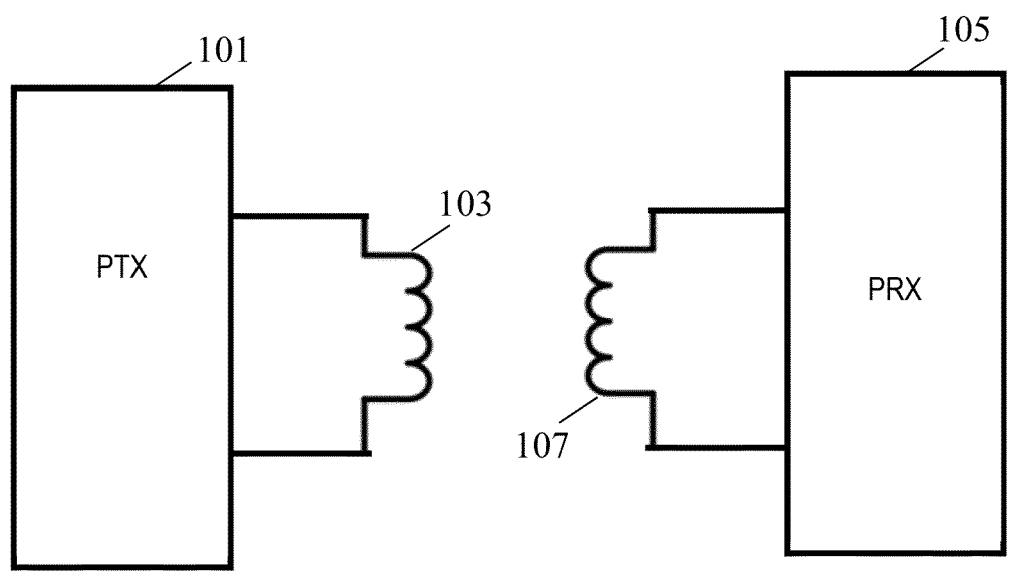
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides an inductive electromagnetic power transfer signal which may inductively transfer power from the power transmitter 101 to the power receiver 105. Specifically, the power transmitter 101 generates an electromagnetic signal, which is propagated as a magnetic flux by the transmitter coil or inductor 103. The power transfer signal may typically have a frequency between around 20 kHz to around 500 kHz, and in many practical systems may be around 120-150 kHz. The transmitter coil 103 and the power receiving coil 107 are loosely coupled and thus the power receiving coil 107 picks up (at least part of) the power transfer signal from the power transmitter 101. Thus, the power is transferred from the power transmitter 101 to the power receiver 105 via a wireless inductive coupling from the transmitter coil 103 to the power receiving coil 107. The term power transfer signal is mainly used to refer to the inductive signal/magnetic field between the transmitter coil 103 and the power receiving coil 107 (the magnetic flux signal), but it will be appreciated that by equivalence it may also be considered and used as a reference to an electrical signal provided to the transmitter coil 103 or picked up by the power receiving coil 107.

In the example, the power receiver 105 is specifically a power receiver that receives power via the receiver coil 107. However, in other embodiments, the power receiver 105 may comprise a metallic element, such as a metallic heating element, in which case the power transfer signal directly induces eddy currents resulting in a direct heating of the element.

In the following, the operation of the power transmitter 101 and the power receiver 105 will be described with specific reference to an embodiment generally in accordance with the Qi or Ki Specifications (except for the herein described (or consequential) modifications and enhancements). Many wireless power transfer systems utilize resonant power transfer where the transmitter coil 103 is part of a resonance circuit and typically the receiver coil 107 is also part of a resonance circuit. In many embodiments, the resonance circuits may be series resonance circuits and thus the transmitter coil 103 and the receiver coil 107 may be coupled in series with a corresponding resonance capacitor. The use of resonance circuits tends to provide a more efficient power transfer.

Normally, a wireless power transfer system employs a power control loop in order to steer the system towards the appropriate operating point. This power control loop changes the amount of power that is transmitted from the power transmitter to the power receiver. The received power (or voltage or current) can be measured and together with the setpoint power value, an error signal can be generated. The power receiver sends this error signal to the power control function in the power transmitter to reduce the static error, ideally to zero.

Figure 2:
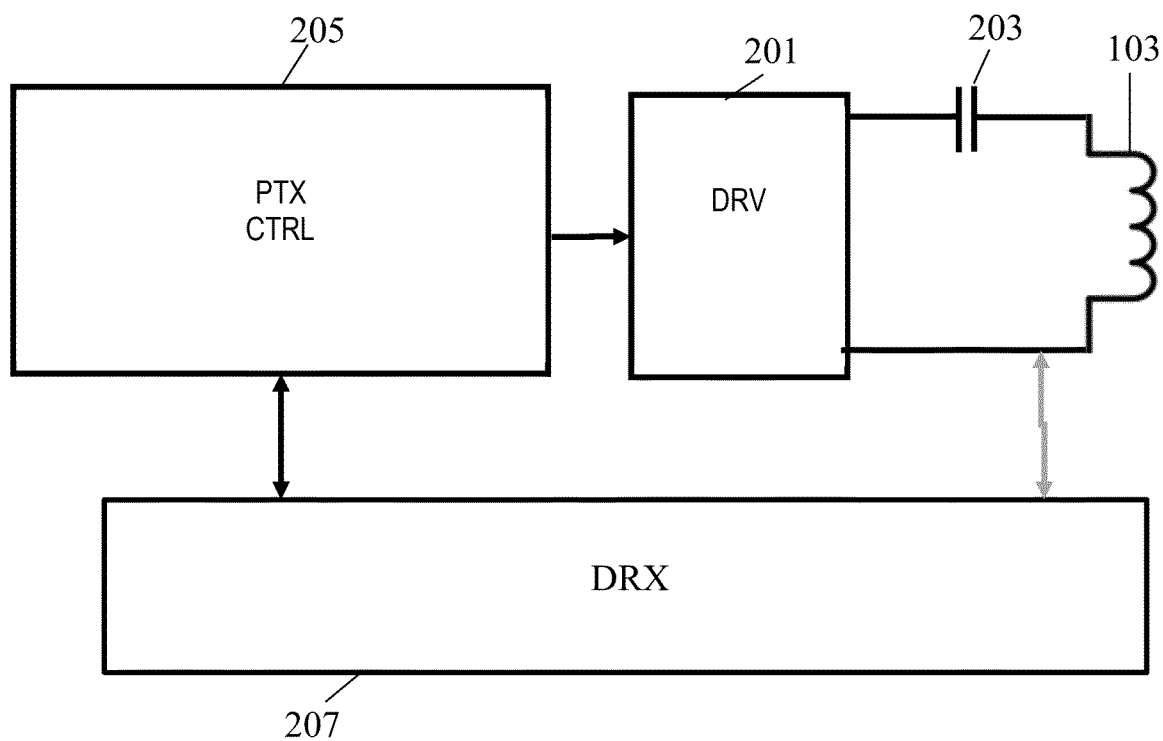
FIG. 2 illustrates an example of elements of a power transmitter.

FIG. 2 illustrates elements of the power transmitter 101 of FIG. 1 in more detail.

The power transmitter 101 includes a driver 201 which can generate a drive signal that is fed to the transmitter coil 103 which in return generates the electromagnetic power transfer signal thereby providing a power transfer to the power receiver 105. The transmitter coil 103 is part of an output resonance circuit which comprises the transmitter coil 103 and a capacitor 203. In the example, the output resonance circuit is a series resonance circuit, but it will be appreciated that in other embodiments, the output resonance circuit may be a parallel resonance circuit. It will be appreciated that any suitable resonance circuit may be used including one using multiple inductors and/or capacitors.

Figure 3:
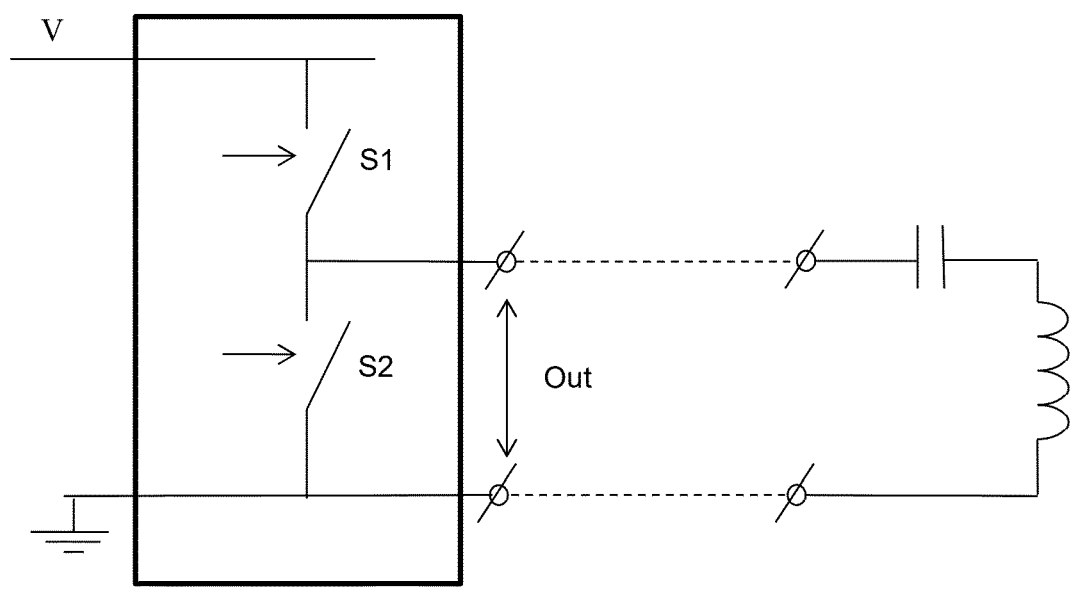
FIG. 3 illustrates an example of a half bridge inverter for a power transmitter.
Figure 4:
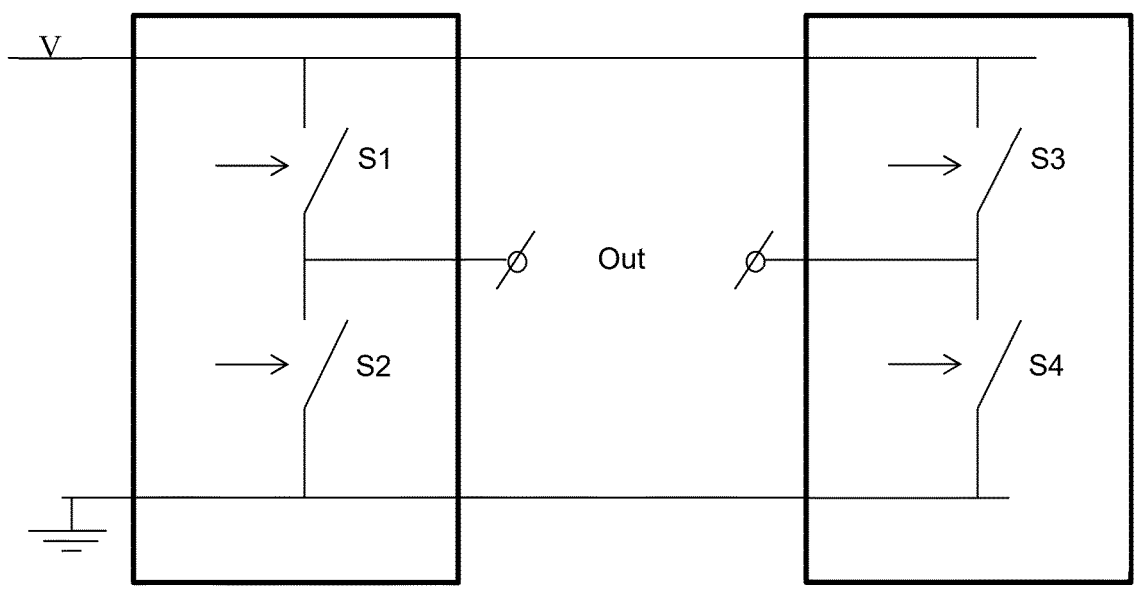
FIG. 4 illustrates an example of a full bridge inverter for a power transmitter.

The driver 201 generates the current and voltage which is fed to the output resonance circuit and thus to the transmitter coil 103. The driver 201 is typically a drive circuit in the form of an inverter which generates an alternating signal from a DC Voltage. The output of the driver 201 is typically a switch bridge generating the drive signal by the appropriate switching of switches of the switch bridge. FIG. 3 shows a half-bridge switch bridge/inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically, the output of the inverter is connected to the transmitter inductor via a resonance capacitor. FIG. 4 shows a full-bridge switch bridge/inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a square-wave signal at the output. The switches are opened and closed with the desired frequency.

The power transmitter 101 further comprises a power transmitter controller 205 which is arranged to control the operation of the power transmitter 101 in accordance with the desired operating principles. Specifically, the power transmitter 101 may include many of the functionalities required to perform power control in accordance with the Qi or Ki Specification.

The power transmitter controller 205 is in particular arranged to control the generation of the drive signal by the driver 201, and it can specifically control the power level of the drive signal, and accordingly the level of the generated power transfer signal. The power transmitter controller 205 comprises a power loop controller controlling a power level of the power transfer signal in response to the power control messages received from the power receiver 105 during the power transfer phase.

The power transmitter 101 further comprises a data receiver 207 which is arranged to receive data transmitted to the power transmitter 101 from the power receiver 105. The data is transmitted by load modulation where the power receiver 105 changes a loading of the power transfer signal in accordance with data symbols being communicated. The data receiver 207 is coupled to the output circuit 103, 203 and is arranged to detect variations in the load of the power transfer signal. The data receiver 207 is arranged to determine received data symbols based on the measured loading values. It will be appreciated that many different approaches for receiving load modulation will be known to the skilled person.

The received data symbols are fed from the data receiver 207 to the power transmitter controller 205 which may adapt the operation of the power transfer in response to this data. For example, power error data may be received and the power transmitter controller 205 may adapt the power level of the drive signal thereby implementing a power control loop with the power receiver 105.

Figure 5:
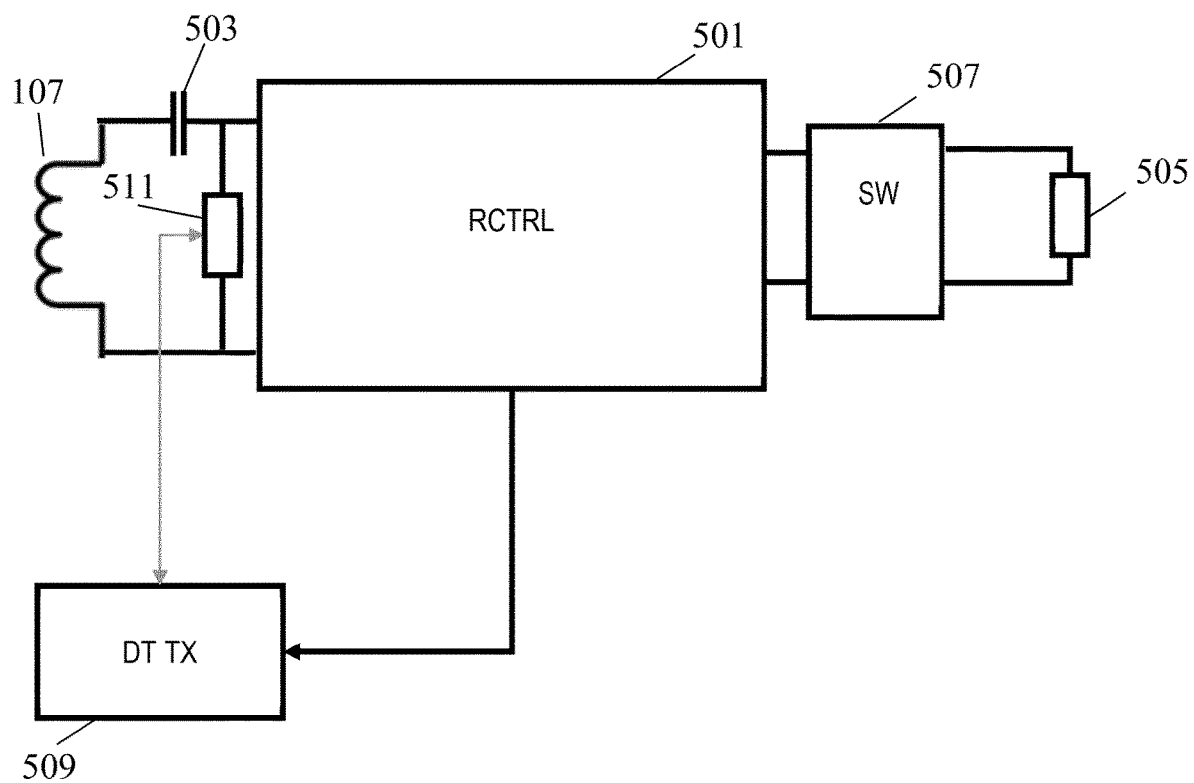
FIG. 5 illustrates an example of elements of a power receiver in accordance with some embodiments of the invention.

FIG. 5 illustrates some exemplary elements of the power receiver 105. In the example, the receiver coil 107 is coupled to a power receiver controller 501 via a capacitor 503 which together with the receiver coil 107 forms an input resonance circuit. Thus, the power transfer may be a resonant power transfer between resonance circuits. In other embodiments, only one, or none, of the power receiver and the power transmitter may utilize a resonance circuit for power transfer.

The power receiver controller 501 couples the receiver coil 107 to a load 505 via a switch 507. The power receiver controller 501 includes a power control path which converts the power extracted by the receiver coil 107 into a suitable supply for the load 505. In some embodiments, the power receiver controller 501 may provide a direct power path which simply connects the input resonance circuit to the switch 507 or load 505, i.e. the power path of the power receiver controller 501 may simply be implemented by two wires. In other embodiments, the power path may include e.g. rectifiers and possibly smoothing capacitors to provide a DC voltage. In yet other embodiments, the power path may include more complex functions, such as e.g. voltage control circuitry, impedance matching circuitry, current control circuitry etc. Similarly, it will be appreciated that the switch 507 may only be present in some embodiments and that in some embodiments the load 505 may permanently be coupled to the input resonance circuit.

In addition, the power receiver controller 501 may include various power receiver controller functionality required to perform power transfer, and in particular functions required to perform power transfer in accordance with the Qi or Ki Specifications.

The power receiver 105 is arranged to transmit data to the power transmitter 101. Such data may specifically include power control loop error messages used to implement a feedback power loop for controlling the power level of the power transfer signal during power transfer as will be known to the skilled person. The power receiver may in many embodiments be capable of transmitting a range of different messages serving different purposes as known to the skilled person. For example, a range of different messages such as those specified in the Qi Specifications may be transmitted. Messages may comprise one or more data bits/symbols.

The power receiver is arranged to transmit messages to the power transmitter using load modulation.

As will be well known to the skilled person, for load modulation, changes in the loading of the power transfer signal may be introduced by the power receiver where the changes are in accordance with data values to be transmitted. These changes can then be detected by the power transmitter in order to decode the data from the power receiver.

Load modulation may be used as the method for the power receiver to communicate control messages, or other data, to the power transmitter in accordance with e.g. the Qi wireless power standard.

There are typically two main ways of performing load modulation, namely either to directly change the resistive load/power extraction of the input circuit and/or to detune the resonance of the input circuit e.g. by changing a reactive loading of the input circuit (typically switching a capacitor in/out in line with data to be transmitted). Similar approaches may be used by the power receiver for load modulating the power transfer signal. Thus, load modulation may use real and/or reactive load changes.

Correspondingly, at the power transmitter, detection approaches such as those known for Qi Specification systems may be used to detect the load variations. For example, a direct measurement of a power level or current amplitude of the drive signal may be used as indications of the loading, and thus of the load modulation variations introduced by the power receiver.

The power receiver 105 comprises a data transmitter 509 which is arranged to transmit data to the power transmitter 101 by load modulating the power transfer signal.

In the example, the data transmitter 509 is arranged to control a variable load 511 that provides a modulation loading of the power transfer signal. Variations in the value of the variable load 511 results in a changed effective load provided to the receiver coil 107. As a result the induced power (real and/or reactive) changes and thus the loading of the power transfer signal by the receiver coil 107 changes. The loading of the receiver coil 107/the power transfer signal is dependent on the value of the variable load. Specifically, changes in the value of the variable load results in changes in the loading of the power transfer signal. The data transmitter 509 is arranged to load modulate the power transfer signal by varying the value of the variable load thereby varying the modulation loading of the power transfer signal. The modulation loading is a variable loading of the power transfer signal providing the load modulation of the power transfer signal. The modulation loading can be considered to be/correspond to/represent a load and/or impedance value of the variable load.

Thus, the data transmitter 509 is arranged to change the value of the variable load in dependence on data symbol values being transmitted thereby providing a varying modulation loading of the power transfer signal.

The data transmitter 509 is coupled to the variable load 511 and is arranged to modify this in response to the data symbols to be transmitted. Thus, the data transmitter 509 is arranged to vary the variable load to provide a modulation loading of the power transfer signal. The data transmitter 509 may specifically be arranged to provide a modulation loading pattern for each data symbol where the modulation loading pattern is dependent on the data symbol value. The modulation loading pattern is different for different data symbol values. The power transmitter may accordingly estimate a modulation load pattern for the power transfer signal and determine the data symbol value based on this detected modulation load pattern. e.g. by selecting the data symbol value that is most likely to have resulted in the received load pattern (maximum likelihood demodulation).

In many embodiments, the variable load may be a binary variable load having two possible load values. Further, in many embodiments, the variable load may be a purely resistive load or a purely reactive load. For example, the variable load may be a resistor or capacitor that can be switched between being decoupled from the input circuit and being coupled to the input circuit (e.g. effectively being switched on/off). The data transmitter 509 may be arranged to control the switch that switches the resistor/capacitor in out.

For example, the data transmitter 509 may be arranged to switch in/out a communication capacitor (or other impedance) e.g. positioned in parallel with the power receiver controller 501 or with the resonance capacitor 503 thereby being able to vary the resonance frequency and the loading of the power transfer signal.

The modulation load pattern may in some embodiments be a very simple pattern and may indeed in some embodiments correspond to a single constant value. For example, a binary modulation may be achieved by the load impedance being switched in or out depending on the data symbol value being modulated onto the power transfer signal. For example, for a "1" value a modulation capacitor may be switched out of the input circuit (not coupled to the input circuit) for the entire symbol duration and for a "0" value a modulation capacitor may be switched in the input circuit (coupled to the input circuit) for the entire symbol duration. However, in many embodiments, each data symbol is typically represented by more complex modulation load patterns, and modulation load patterns may in many embodiments include at least two different modulation load levels.

The data transmitter 509 may be coupled to the power receiver controller 501 and may be arranged to receive data from the power receiver controller 501 for transmission to the power transmitter 101.

For example, the data transmitter 509 may receive power error control data from the power receiver controller 501 and may transmit corresponding power error control messages to the power transmitter 101 using load modulation. In operation, the system is typically arranged to control the drive signal such that the power transfer signal attains suitable operating parameters/properties and such that the power transfer operates at a suitable operating point. In order to do so, the power transmitter is arranged to control a parameter of the drive signal using a power control loop where a power property of the power transfer signal/drive signal is controlled in response to power control error messages that are received from the power receiver.

Figure 6:
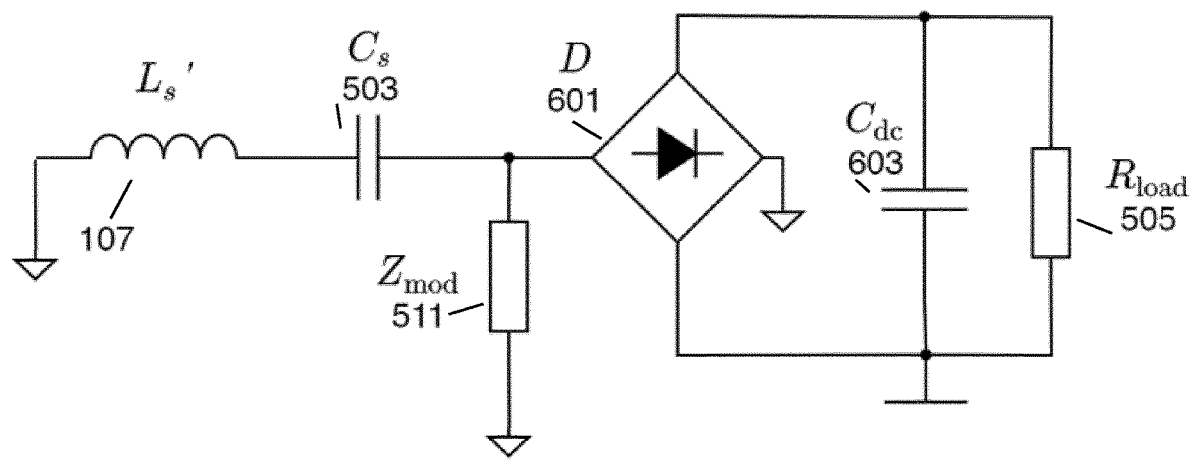
FIG. 6 illustrates an example of a power supply path for the power receiver of FIG. 5.

The power path of the power receiver may specifically have a simplified equivalent circuit corresponding to the circuit shown in FIG. 6. The input circuit 107, 503 is coupled to a rectifier 601, the output of the rectifier 601 is coupled to a smoothing capacitor 603. The load 505 is coupled to the smoothing capacitor 603.

The output level, and specifically the voltage provided to the load, thus depends directly on the level of the power transfer signal/the electromagnetic field strength. The power control loop implemented by the power control loop provides continuous and dynamic adaption of the level of the power transfer signal to provide the desired power to then load. For example, the voltage at the smoothing capacitor may be measured and if it drops below a lower threshold, power up messages may be transmitted to the power transmitter 101 increasing the level of the power transfer signal. If the capacitor voltage increases above a higher threshold, power down messages may be transmitted to the power transmitter 101 resulting in this reducing the level of the power transfer signal.

However, whereas load modulation is an effective communication technique for wireless power transfer system, the Inventors have realized that it also has some disadvantages, and in particular that the communication approach may interfere with the power transfer operation. Specifically, the load modulation may cause variations in the signal extracted by the input circuit that may result in variations in the power/voltage provided to the load.

Figure 7:
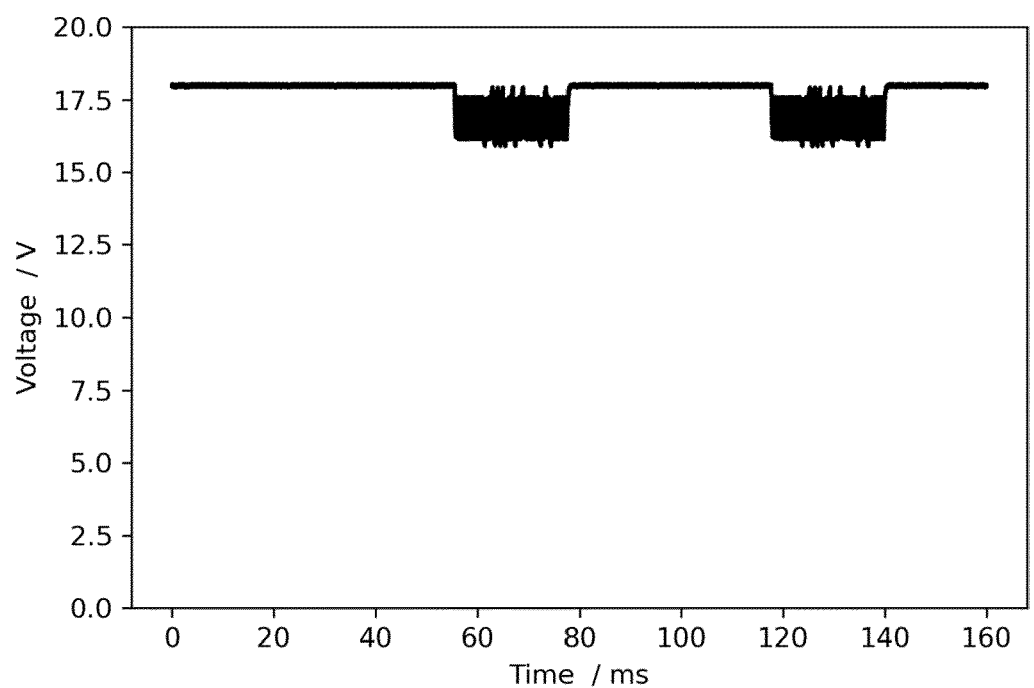
FIG. 7 illustrates an example of a supply voltage provided to a load of a wireless power receiver.
Figure 8:
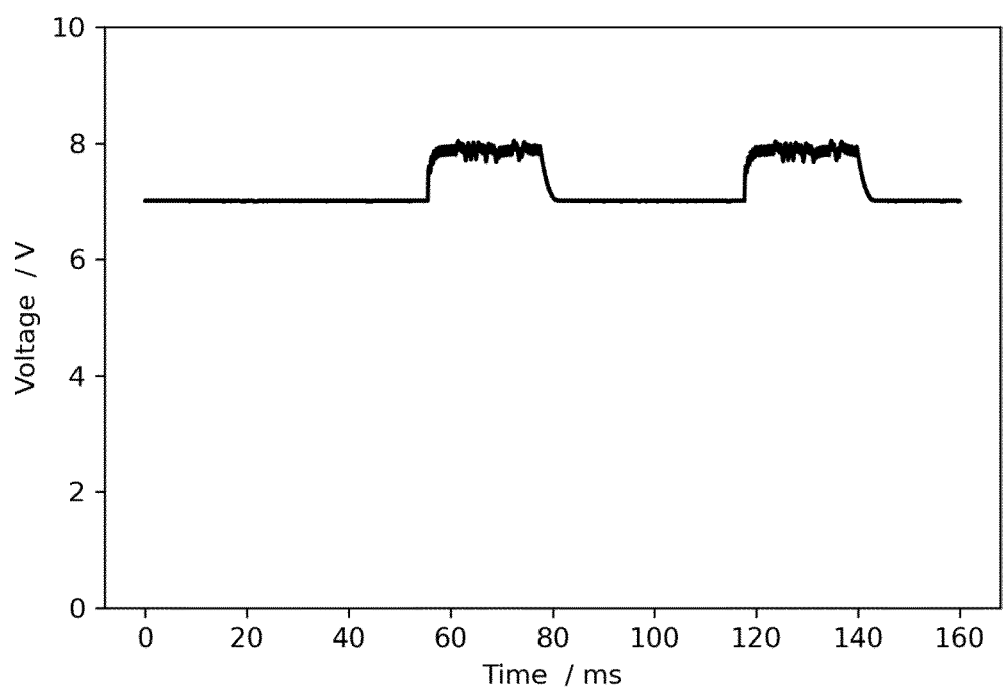
FIG. 8 illustrates an example of a supply voltage provided to a load of a wireless power receiver.

FIGS. 7 and 8 illustrate an example of the voltage that may be provided to the load 505 for a power path such as the one shown in FIG. 6. In most wireless power transfer system, data is transmitted in data packets, and FIG. 7 illustrate examples where such data packets are transmitted by switching a modulation capacitor of 10 nF to be respectively disconnected and coupled to the output of the input circuit respectively. FIG. 7 shows an example for an 18 V, 30 W load and with a relatively high coupling and FIG. 8 shows an example for a 7V, 0.1 W load and with a relatively low coupling.

In the examples, it can be seen that the load modulation data packets cause voltage (and thus power) variations in what is provided to the load. In some applications, such voltage variations may be acceptable but in many practical applications they are highly undesirable. Voltage variations may for example introduce noise or may in some cases result in malfunction of a device or apparatus provided power by the power receiver 105 (i.e. a device or apparatus being the load 505 for the power receiver 105).

The inventors have in particular realized that the voltage variations may be caused by different effects and that different approaches can be applied to reduce various aspects of the voltage variations.

The described approach of FIGS. 1, 2, and 5 may include functionality for improving power transfer and in many scenarios it may for example reduce voltage variations when load modulation is used for communication from the power receiver to the power transmitter.

In the approach, data communication is performed in communication time intervals that are interspersed with non-communication time intervals in which data symbols/information data is not transmitted from the power receiver to the power transmitter.

In the approach, the data symbols are during the communication time intervals communicated to the power transmitter using load modulation. Thus, during the communication time intervals, the data transmitter 509 is arranged to vary the variable load to apply a modulation loading pattern to the input circuit/power transfer signal where the modulation loading pattern is dependent on the data symbol value to be transmitted. Each possible data symbol is linked to a modulation loading pattern and when transmitting a specific data symbol value, the data transmitter 509 may retrieve the linked modulation loading pattern for the data symbol value and feed this to the data transmitter 509 which may proceed to vary the variable load accordingly. Specifically, in many embodiments, the variable load is binary and the data transmitter 509 may be arranged to switch between the two load values in accordance with the modulation loading pattern, e.g. by switching a modulation capacitor. The modulation loading patterns are different for different data symbol values.

In some embodiments, the modulation loading pattern may be a simple constant loading corresponding to the variable load being unchanged for the duration of the data symbol. For example, for a binary data symbol, one value may be represented by a modulation capacitor which is switched in to the input resonance circuit and the other value may be represented by the modulation capacitor being switched out of this circuit.

In other embodiments, the modulation loading patterns may comprise a plurality of different sub-intervals with the variable load potentially being switched between different sub-intervals.

As a specific example, in some embodiments, the modulation loading pattern for each possible data symbol value may comprise at least two different loading values. For example, a communication approach may be used to provide binary communication by one binary value being represented by a load transition from a higher to a lower loading and the other binary value being represented by a load transition from a lower to a higher loading.

During a communication time intervals, a plurality of data symbols, and specifically bits, may be transmitted, and often a data packet is transmitted. In many embodiments, a communication time interval may have a duration no less than 1 μsec and no more than 1 msec. In many embodiments, no less than 24 bits and in some cases no more than 048 bits may be transmitted during each communication time interval.

Thus, during a communication time interval, load modulation is used to communicate data from the power receiver to the power transmitter and thus a plurality and often many loading transitions occur. Typically, these occur relatively rapidly/frequently, and in many embodiments the load transitions may be such that the average loading/value of the variable load is substantially the same for all communication time intervals, and in some cases even for each modulation loading pattern.

In the described approach, no data symbols and no information are communicated during non-communication time intervals. However, despite no communication of information, the data transmitter 509 is arranged to control the variable load to repeatedly change the modulation loading during non-communication time intervals. The data transmitter 509 may specifically be arranged to apply a loading variation pattern that includes multiple loading transitions. For example, a repeating loading variation pattern may be applied by the data transmitter 509 during the non-communication time intervals.

In many embodiments, the loading variations during the non-communication time intervals may be arranged to have substantially the same (average) properties as loading variations that occur during the communication time intervals. For example, the repeating modulation loading pattern may be designed to have properties such that the average modulation loading is the same as for the modulation loading patterns for the data symbols and with the same average time between loading transitions/changes as for the communication time intervals.

Accordingly, in the approach, modulation loading variations not only occur during the communication time intervals but are also continued into the non-communication time intervals, and in many cases such that at least average or typical properties of the loading variations are continued into the non-communication time intervals.

The Inventors have realized that such an approach may reduce the impact and specifically the variations to the power transfer caused by load modulation, and specifically may reduce the voltage variations.

Figure 9:
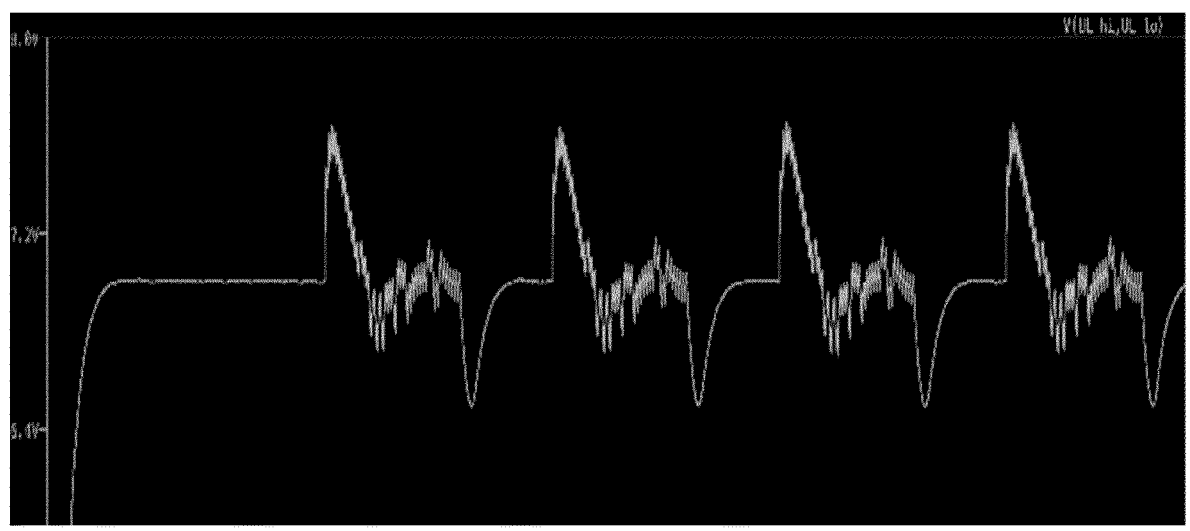
FIG. 9 illustrates an example of a supply voltage provided to a load of a wireless power receiver.

In particular, the Inventors have realized that when starting load modulation in accordance with the conventional approach, a step or transient occurs due to the change in the modulation load, and specifically due to this resulting in an average total loading of the input circuit. Specifically, when the variable load is a reactive load, the variation of the load results in a change of the effective resonance frequency of the input circuit. This change in the resonance frequency results in a change in the power transfer and in the output voltage to the load. Thus, when starting the load modulation, the average resonance frequency of the input circuit changes which results in a step effect as can be seen e.g. in FIG. 8. The step effect in the average voltage remains for as long as the data packet is transmitted. However, in examples where power control is operative and sufficiently fast to affect the voltage during data packets, the average voltage may be returned to the desired level by the power control loop. However, in such cases a disadvantageous transient may occur at the start and end of each data transmission. The transient effect is present until the system adapts to the modified average operating point. An example of such transients effects is illustrated in FIG. 9 where it can be seen that the average voltage is returned to the desired level during and after a data transmission.

However, whereas it would intuitively be considered counterintuitive to vary the modulation load when no data is to be transmitted due to the voltage variations incurred for every load change as well as due to the increased complexity of operation, the Inventors have realized that by implementing a dummy load modulation variation during the non-communication time intervals, the step and/or transients at the start of the communication time intervals may be reduced, and even potentially be substantially removed.

Further, this may in many embodiments be advantageous even if it results in some voltage variations/noise during the communication time intervals that would otherwise not be present. In particular, it may in many embodiments reduce the peak voltage variation as this typically occurs during the step or transient (due to this potentially being dominant or due to the transient and switch variations adding together to provide the peak value as can be seen in e.g. FIG. 9). For example, in FIG. 9 it is clear that in this scenario, the amplitude of the initial transient at the onset of a communication time intervals, is substantially higher than the amplitude of the individual switch noise that occur for every switching of the variable load. Thus, the average change in resonance frequency has a more substantial effect than the individual switch effects and the resulting noise. In FIG. 7 the two effects are of similar order of magnitude. However, as the effects are additive, reducing the transient may still be highly advantageous and may reduce the peak voltage deviation/variation. This may in many embodiments be advantageous even if it results in the switch noise being present at all times and not only during the communication time intervals (indeed if the load is designed to operate with the switch noise during communication time intervals, it is also likely to be able to operate with this during the non-communication time intervals).

Further, various approaches may be implemented to reduce the switch noise during the non-communication time intervals. As a specific example, the switching during the non-communication time intervals may be arranged to occur faster than during the communication time intervals, and potentially substantially faster. Indeed, during communication time intervals, the variable load/modulation loading switching is determined by the communication parameters and operation. However, in many embodiments, the switching during the non-communication time intervals may not be restricted by such considerations and may be optimized to reduce the switch noise. For example, the switching may be performed such that the average variable load value/modulation loading/resonance frequency is substantially the same in the communication time intervals and the non-communication time intervals. However, the switching during the non-communication time intervals may be at a faster rate, say 10 times faster. This may not affect the amplitude of the switch noise introduced at the input circuit but may result in this being at a much higher frequency than during the communication time intervals. The filtering provided by the smoothing capacitor and associated circuitry may be more efficient at this higher frequency resulting in a reduced voltage switch noise at the load.

Thus, in some embodiments, the data transmitter 509 may be arranged to change the modulation loading during non-communication time intervals at a higher average frequency than an average frequency of modulation loading changes during communication time intervals. In different embodiments, it may be at least 2, 5, or 10 times higher.

The switching of the load modulation during non-communication time intervals may improve the power transfer operation and reduce and/or mitigate the impact of load modulation on the power transfer operating point, and typically it may reduce voltage variations for the load.

The exact modulation variations during the non-communication time intervals will depend on the requirements and preferences of the individual embodiment, and specifically the effect that is desired. For example, in some embodiments it may be desired to have a slow loading variation that may e.g. only partially reduce the transient at the start of a communication time interval. In many embodiments, it may be desirable to reduce the difference between the properties of typical or average loading variations during the communication time intervals and the non-communication time intervals. Thus, in many (but not all) embodiments, it may be desirable to arrange the modulation variations during the communication time intervals to have properties that match those of the communication time intervals.

In many embodiments, the data transmitter 509 is arranged to control the variable load to repeatedly change the modulation loading during non-communication time intervals such that the average value of the variable load/the average modulation loading is substantially the same during communication time intervals and non-communication time intervals.

In some embodiments, the data transmitter 509 may be arranged to only keep the average loads/modulation loadings substantially the same. This may typically allow a substantial reduction in e.g. voltage variations while still allowing a relaxed and low complexity operation during the non-communication time intervals. In many embodiments, the approach may for example allow predetermined and fixed load variation patterns to be used during the non-communication time intervals.

In many embodiments, the data transmitter 509 may be arranged to control the variable load to repeatedly change the modulation loading during non-communication time intervals such that a difference between the average modulation loading (and the average values of the variable loads) during the non-communication time interval and communication time intervals differ by less than 10% of the maximum modulation loading change/variation that may occur during the communication time intervals. The maximum variation/ change of the modulation loading during a communication time interval is the difference between the minimum modulation loading and the maximum modulation loading for the data symbols. The modulation loading may be considered to correspond to the values of the variable load, and thus the minimum and maximum modulation loading may in many embodiments be equivalent to the minimum and maximum values of the variable load for the data symbols. The maximum modulation loading may be the highest modulation loading and the minimum modulation loading may be the lowest modulation loading possible for all the possible data symbol values.

Typically, the variable load, and thus the modulation loading, has only a limited number of possible values. Indeed, often binary operation is used with the variable load and the modulation loading having only two possible values (and with each data symbol being represented by a different pattern/sequence of such two possible values. In that case, the maximum load value/modulation loading corresponds to one of the two possible values and the minimum load value/modulation loading corresponds to the other. Thus, the maximum modulation loading change/variation, corresponding to the difference between the maximum and minimum modulation loading, is simply the difference between these values.

Thus, in many embodiments, the switching of the variable load is during the non-communication time intervals such that the average modulation loading/variable load value is less than 10% of such a difference. In some embodiments, it may even be maintained to be less than 1% or 5% of such a value.

Such an approach may thus allow that the change in average modulation loading when entering a communication time interval is relatively low and thus may contribute to a reduce transient in the power transfer operating point, and specifically the voltage.

In many embodiments, timing properties of the loading variations during the communication time intervals may be controlled to provide improved advantageous operation. As mentioned previously, in many embodiments, the switching operation during the non-communication time intervals may be arranged to occur as frequently, or even more frequently, during non-communication time intervals as during communication time intervals.

For example, in many embodiments, an average load change frequency for the variable load is by the data transmitter 509 controlled to be at least as high during non-communication time intervals as during communication time intervals. In many cases, it may even be higher. However, it may also in some cases be desirable to have slower switching during the non-communication time intervals while still allowing this to be sufficiently fast to provide an operating point (including an average resonance frequency of the input circuit) that does not differ too much from that of the communication time intervals. In many embodiments, the average frequency during a non-communication time interval is no less than 50% of an average frequency during communication time intervals.

In some embodiments, the data transmitter 509 may be arranged to control the variable load to repeatedly change the modulation loading during non-communication time intervals such that an average time between modulation loading changes during the non-communication time interval is no less than 50%, 100% or 150% of an average time between modulation loading changes during the communication time intervals. This will in many embodiments allow for the load switching to be sufficiently fast to ensure that the operating point is maintained sufficiently close to the average operating point during the communication time intervals.

In some embodiments, the data transmitter 509 may be arranged to control the variable load to repeatedly change the modulation loading during non-communication time intervals such that a maximum average time between modulation loading changes during the non-communication time interval is no less than 50%. 100% or 150% of an average time between modulation loading changes during the communication time intervals. This will in many embodiments allow for the load switching to be sufficiently fast to ensure that the operating point is maintained sufficiently close to the average operating point during the communication time intervals. It may in particular prevent that the operating point has time to stabilize at a value corresponding to one specific value of the variable load/modulation loading because it is kept at this value for too long.

In some embodiments, each data symbol may as previously mentioned be represented by a single constant modulation loading that is applied during the entire symbol time. For example, for a binary communication, the data transmitter 509 may simply switch the variable load between an impedance being coupled to the input circuit and not being coupled to the input circuit. For each new bit, the data transmitter 509 may select the appropriate switch setting for the variable load and leave it at that level until the start of the next bit where a new switch decision is made based on the new bit value.

However, in many embodiments, a data transmitter 509 may be used which comprises two or more different load values/modulation loadings for at least one data symbol value, and typically for at least two data symbol values. In many embodiments, the modulation loading for one, two, or possibly more data symbol values are represented by modulation loading patterns that include at least one loading change/transition. In many embodiments, all data symbol values are represented by modulation loading patterns that include at least two different loading values, and thus which include at least one transition.

As a specific example, the variable load may be a binary load and binary communication may be implemented by one data symbol value being represented by a modulation loading pattern having a load transition from a first value of the variable load/modulation loading to a second value of the variable load/modulation loading, and with the other data symbol value being represented by a modulation loading pattern having a load transition from the second value of the variable load/modulation loading to the first value of the variable load/modulation loading.

The system may use load modulation with each symbol being represented by a load transition occurring during the symbol duration (typically at the center time) and with the direction of the load transition indicating the binary symbol value.

Such load transitions approaches may provide substantial advantages in many scenarios. it may allow load modulation detection to be performed without requiring an absolute reference level to be generated and used to determine the received data symbol. Indeed, the data symbol values may be determined by measuring a load value during the first half and the second half of the data symbol time, and to determine the binary value as the sign of the difference between these.

A further substantial advantage of such an approach in the described system is that it ensures a relatively high number of load transitions during the communication time intervals. Frequent load transitions may allow the output voltage to remain closer too the average value and thus may reduce the switch noise on the output. This may specifically be the case where the smoothing capacitor is sufficiently large to ensure that no loading remains for long enough for the power transfer to stabilize. Another substantial advantage is that the modulation loading during the communication time intervals is highly predictable. For example, it is predictable how long the modulation loading will be at a given value before changing and it will provide an average load that is predictable and indeed that is non-data dependent.

As a result, the load variation during the communication time intervals can effectively and accurately be repeated during the non-communication time intervals such that e.g. the average/typical/mean properties are repeated. For example, a load variation pattern can be applied during the non-communication time intervals which has the same average modulation loading and transition intervals as during the communication time intervals.

Thus, using modulation loading transitions for each data symbol may be highly advantageous in the described approach and may for example allow that the transient performance at the start of a communication time interval may be mitigated or reduced, or indeed even removed in some cases.

The data transmitter 509 may in some embodiments be arranged to transmit data symbols by load modulating the power transfer signal by a sequence of modulation load values corresponding to a chip sequence. The data transmitter 509 may transmit the data symbols using an approach that is e.g. similarly to a Direct Sequence Spread Spectrum (DSSS) modulation which uses a chip sequence to modulate the data symbols. The data symbols/bits are modulated by a (typically pseudorandom) bit sequence also referred to as a spreading sequence. Each spreading-sequence bit, which is known as a chip, has a much shorter duration (larger bandwidth) than the original message bits.

In some embodiments each symbol is represented by a chip sequence comprising a plurality of chips, and typically with a sequence comprising 5 to 1023 chips. Thus, rather than simply varying the load in accordance with each symbol or bit, the data transmitter 509 may be arranged to transmit a given symbol (typically a bit) by a series of load changes and variations where the changes and variations are different for each symbol. Specifically, a chip sequence may be defined for each symbol and when transmitting a given symbol, the data transmitter 509 may retrieve the chip sequence for that specific symbol and proceed to load modulate the power transfer signal in accordance with the chip sequence for the symbol. Each chip sequence is directly linked to a modulation loading pattern which specifically may be the same as the chip sequence.

In some embodiments, the modulation loading pattern for each possible data symbol value may accordingly comprise a load modulation chip sequence of at least 5, and in some cases at least 8, 16, or 32, load modulation chips.

Similarly, as will be described in more detail later, the power transmitter may detect the load modulation by considering the whole chip sequence, and specifically may seek to determine the received symbol as the one for which the measured load variation chip pattern most closely matches the chip sequence pattern for that symbol.

Thus, in some embodiments a direct sequence spread spectrum load modulation may be used with each data symbol value being represented by a different chip sequence/modulation loading pattern.

Such an approach may in particular allow the modulation depth, i.e. the magnitude of the load variations to be reduced substantially which may for example reduce electromagnetic noise and interference, may reduce acoustic noise, and may reduce spurious oscillations. It may also in many embodiments result in improved signal to noise ratios and may result in a substantially improved and often more reliable communication with e.g. often a lower bit error rate. Thus, a general overall improved power transfer can be achieved.

Figure 10:
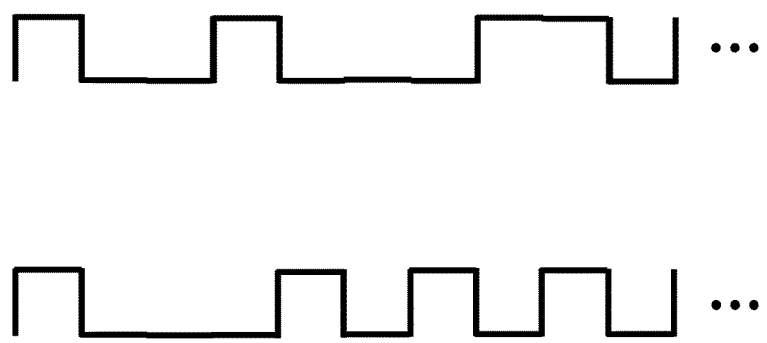
FIG. 10 illustrates an example of chip sequences.

FIG. 10 illustrates an example of parts of two possible chip sequences/modulation loading patterns. Each chip sequence comprises a sequence of chips. Typically, the set of chip values is two, corresponding to a binary chip sequence. A symbol time is thus divided into a plurality of chip intervals with the chip sequences of the chips being different for different data symbols. Typically, each sequence includes at least ten chips, and often substantially more. In many embodiments, each chip sequence may have a length of $2^N-1$ where N is an integer of typically no less than 4.

Each of the stored chip sequences is assigned to one symbol. Thus, each possible data symbol value that may need to be transmitted to the power transmitter may have a linked/associated chip sequence/modulation loading pattern. For example, where only two data symbols are possible, i.e. where a binary communication is implemented, the set of chip sequences may comprise only two chip sequences. Each possible data symbol value may be linked/represented by one modulation chip sequence. Thus, for a given data symbol value to be transmitted, the corresponding/linked modulation chip sequence is determined and modulated on to the power transfer signal by load modulation. For example, where only two data symbols are possible, i.e. where a binary communication is implemented, the set of chip sequences may comprise only two chip sequences.

In many embodiments, the one or more chip sequences may be represented by a relationship to another chip sequence. For example, for binary communication, the data transmitter 509 may store a single modulation chip sequence corresponding to one of the binary data values. The chip sequence for the other binary data value may be represented by the same stored bit sequence as it may be given as the inverse of the stored bit sequence. Thus, often the set of chip sequences utilizes complementary inverse chip sequences for pairs of data symbols and therefore only half of the used chip sequences are typically explicitly stored/determined in the data transmitter 509 with the remaining chip sequences being automatically and implicitly stored/determined as the inverse of these.

Thus, in some embodiments, the modulation chip sequences may include inverse chip sequences. Equivalently, the same modulation chip sequence can be considered to represent two data symbol values, and specifically two binary data symbol values.

The modulation chip sequence is for a given data symbol to be transmitted selected from a set of modulation chip sequences, and in the example the data transmitter 509 provides a set of modulation chip sequences with each chip sequence being linked to a data symbol value. Typically, the set of modulation chip sequences comprises a chip sequence for each possible data symbol value. For example, if binary communication is used, the first set of chip sequences may comprise only two chip sequences. It will be appreciated that the data transmitter 509 may store the chip sequences in any suitable form and does not need to store a full sequence for each possible data symbol. For example, a given modulation chip sequence may be multiplied by a binary symbol value represented by the values 1, −1. At the receiving end, i.e. at the power transmitter, the data value may then be determined by a correlation with the given modulation chip sequence and a determination of the corresponding binary data value dependent on whether this is a positive or negative correlation.

In many embodiments, binary communication may accordingly be used where only two data symbol values are possible (corresponding to a "0" bit value or a "1" bit value). In such cases, one bit value may be represented by a given chip sequence and the other bit value may be associated with the inverse bit sequence, i.e. the bit sequence that results from changing each chip value to the opposite value. The two bit sequences are thus typically complementary with one resulting from the other by multiplication by −1 (with the chip values being represented by +1 and −1).

A particular advantage in such a case is that demodulation is particularly easy as a single correlation can be used to differentiate between bit values as the magnitude of the correlation is the same for the chip sequences, but the signs of the correlation values are opposite.

It will be appreciated that it is equivalent to consider data symbols represented by inverse modulation chip sequences to be represented by one chip sequence or by two chip sequences. It will be appreciated that such a binary approach with two inverse chip sequences being used is equivalent to considering that the two possible binary values are modulated by the same chip sequence but with the data symbols having opposite data values (e.g. +1 and −1).

When the power receiver is about to transmit a data symbol, the value is fed to the data transmitter 509 from the power receiver controller 501 which proceeds to determine the chip sequence that is linked to the data symbol value to be transmitted.

The data transmitter 509 is arranged to modulate the chip sequence onto the power transfer signal. Specifically, a modulation load may be switched in and out (on/off) in line with the chips, i.e. the load may be changed in accordance with the variable load values of the chip sequence/modulation loading pattern.

The chip sequence is selected from a set of chip sequences, and in the example the data transmitter 509 stores such a set of chip sequences with each chip sequence being linked to a data symbol value. Typically, the set of chip sequences comprises a chip sequence for each possible data symbol value. For example, if binary communication is used, the first set of chip sequences may comprise only two chip sequences. It will be appreciated that the data transmitter 509 may store the chip sequences in any suitable form and does not need to store a full sequence for each possible data symbol. For example, one or more chip sequences may be represented by a relationship to another chip sequence. For example, for binary communication, the data transmitter 509 may only store a single chip sequence corresponding to one of the binary data values. The chip sequence for the other binary data value may be represented by the same stored bit sequence as it may be given as the inverse of the stored bit sequence. Thus, often the set of chip sequences utilizes complementary inverse chip sequences for pairs of data symbols and therefore only half of the used chip sequences are typically explicitly stored in the data transmitter 509 with the remaining chip sequences being automatically and implicitly stored as the inverse of these.

The chip sequences in the set are typically of the same length.

The system of FIGS. 1, 2, and 5 may utilize an approach which in many situations may address one or more of the issues associated with load modulation. Load modulation is employed, but each symbol is represented by a chip sequence comprising a plurality of chips, and typically with a sequence comprising 5 to 127 chips. Thus, rather than simply varying the load in accordance with each symbol or bit, the data transmitter 509 is arranged to transmit a given symbol (typically bit) by a series of load changes and variations where the changes and variations are different for each symbol. Specifically, a chip sequence may be defined for each symbol and when transmitting a given symbol, the data transmitter 509 may retrieve the chip sequence for that specific symbol and proceed to load modulate the power transfer signal in accordance with the chip sequence for the symbol.

The power transmitter may detect the load modulation by considering the whole sequence, and specifically the power transmitter may seek to determine the received symbol as the one for which a detected load variation pattern most closely matches the chip sequence pattern for that symbol.

Thus, the data transmitter 509 may be arranged to receive data symbols, typically from the power receiver controller 501, to be transmitted to the power transmitter, it may proceed to determine a corresponding chip sequence and load modulate the power transfer signal by the modulation loading pattern representing this chip sequence. Typically, the data symbols are binary but in some cases higher order modulation symbols may be used (i.e. with more than two possible values). In some cases, such higher order data symbols may correspond to a combination of received data bits. For example, two bits may be combined into a single quaternary data symbol. Such combination may be possible both when the data bits are related and when they are e.g. completely independent.

Longer chip sequences may provide improved noise suppression etc. but may also reduce the data rate as the symbol time increases for a given chip rate. Increased chip sequence lengths also increase complexity and resource demand, especially at the receiver where correlation with longer sequences may substantially require the number of computations required. A typical suitable value is N=5 and this a chip length of 31 chips.

Figure 11:
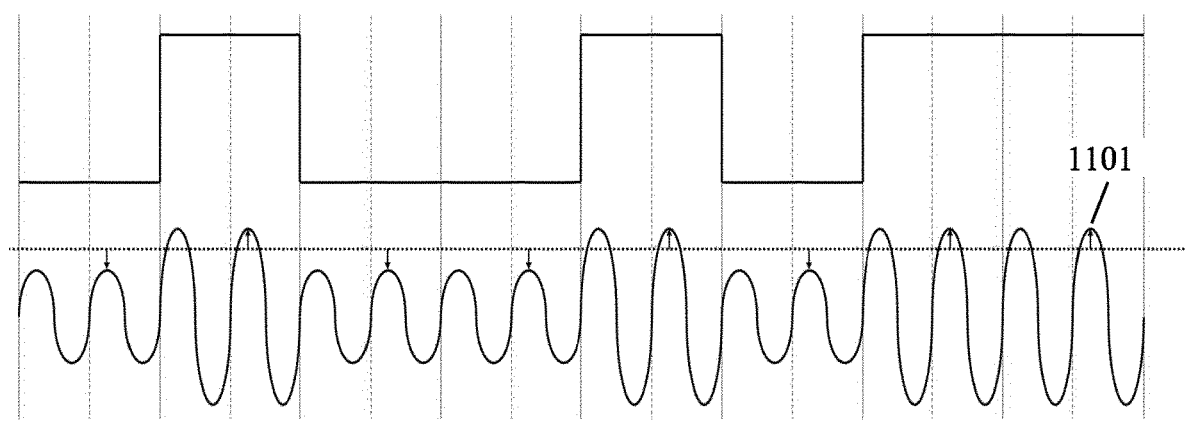
FIG. 11 illustrates an example of a load communication in a wireless power transfer system.

FIG. 11 illustrates an example of how a power transfer signal could be load modulated by chips of a chip sequence. In this example, the modulation is synchronized to the power transfer signal at a rate of one chip per two power signal cycles. The arrows in FIG. 11 indicate times for which the load of the power transfer signal is measured/sampled by then power transmitter to generate load samples that are then correlated with the possible chip sequences. The sampling is synchronized with the power transfer signal and one sample is generated for each chip.

In order to determine the (binary) chip value, the sampled load values are compared to an average level 1101. In the specific example, the load of the power transfer signal is determined as the peak cycle value of the measured signal (which specifically may be a current, voltage, phase, or power of the power transfer signal), and the sampling is synchronized with the peak of the power transfer signal. Further, the average level 1001 of the peak cycle values is first determined, and the chip values then are determined based on whether the measured sample value is above or below the average level 1101.

The example of FIG. 11 requires a reference level to be determined and typically this may be determined as an average level. However, this may introduce some uncertainty and potentially may result in some bit errors.

In some embodiments, each chip of a load modulation chip may be represented by a modulation loading transition occurring during the chip. Each load modulation chip thus comprises at least two different modulation loading values/values of the variable load. For example, as for a differential data symbol modulation, the individual chips may be modulated by a bi-state transition approach. For example, on chip value may be represented by a transition from a lower modulation loading to a higher modulation loading and another chip value may be represented by a transition from a higher modulation loading to a lower modulation loading. In such examples, each chip sequence may be represented by a modulation loading pattern that has two modulation loading values for each chip.

Such an approach may provide substantial advantages by allowing a receiver to determine the chip values simply by considering the difference between two measured load values for each chip. However, further it may increase the switch rate and may make this more predictable thereby allowing an improved correspondence between the switch operation in the communication time intervals and the non-communication time intervals.

The approach of using such Direct Sequence Spread Spectrum (DSSS) or Differential-Direct Sequence Spread Spectrum (D-DSSS) type approaches in the described system may provide a number of advantages. The approach may in particular allow the modulation depth. i.e. the magnitude of the load variations to be reduced substantially which may for example reduce electromagnetic noise and interference, may reduce acoustic noise, and may reduce spurious oscillations. It may also in many embodiments result in improved signal to noise ratios and may result in a substantially improved and often more reliable communication with e.g. often a lower bit error rate. Thus, a general overall improved power transfer can be achieved.

Further, in the described approach the use of such chip sequences/modulation loading patterns may substantially reduce the switch noise/voltage variations. The use of such longer sequences may reduce the modulation depth and the required change in modulation loading may be reduced. For example, a lower value of a switch capacitor may be implemented. This reduction may result in a smaller change in the resonance frequency/operating point resulting in lower noise/variations. Further, the approach allows for a much higher modulation loading switching, and indeed requires it for the same symbol rate to be maintained. The faster switching may further reduce the noise/voltage variations as it is spread over a larger frequency range including higher frequencies. This results in the smoothing capacitor and the low pass filtering effect thereof being more efficient thereby providing a reduced noise level.

Further, not only may be the approach reduce noise and voltage variations during the communication time intervals but it may further allow the noise to be reduced during the non-communication time intervals during which modulation loading variation is also performed. In particular, the variations during the non-communication time intervals may be set to have switching properties (typically statistically or on average) that match those of the communication time intervals. In particular, a higher frequency switching of lower modulation loading changes may be used thereby reducing the switching noise substantially.

Figure 12:
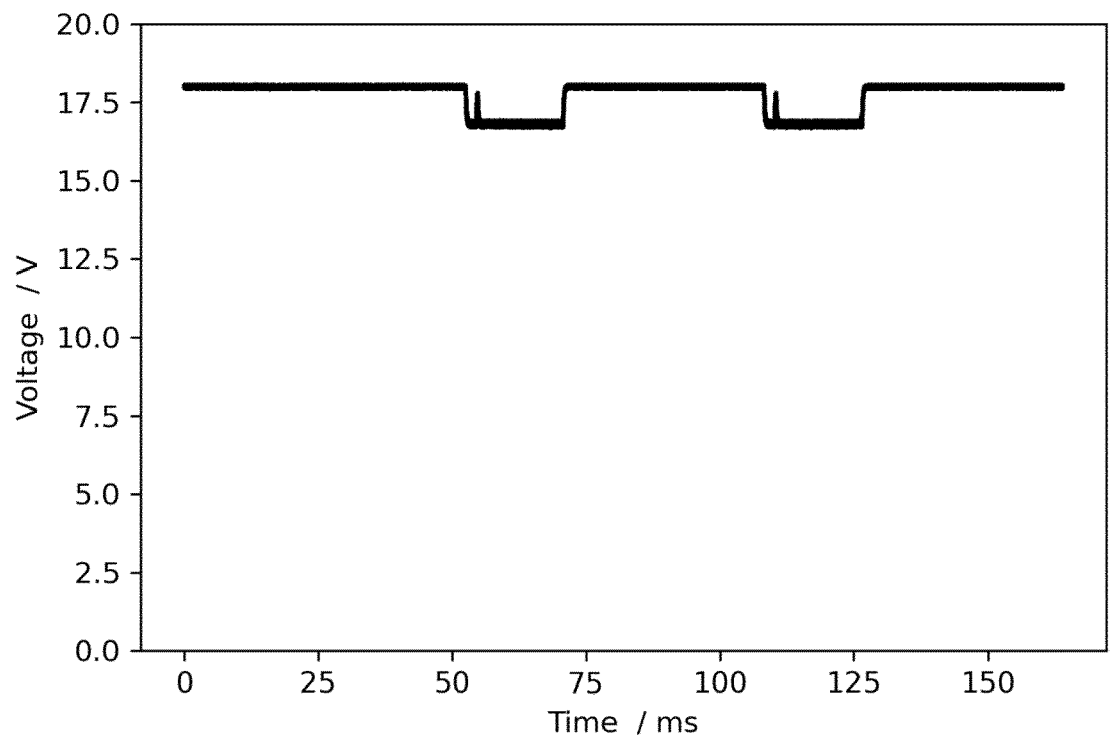
FIG. 12 illustrates an example of a supply voltage provided to a load of a wireless power receiver.
Figure 13:
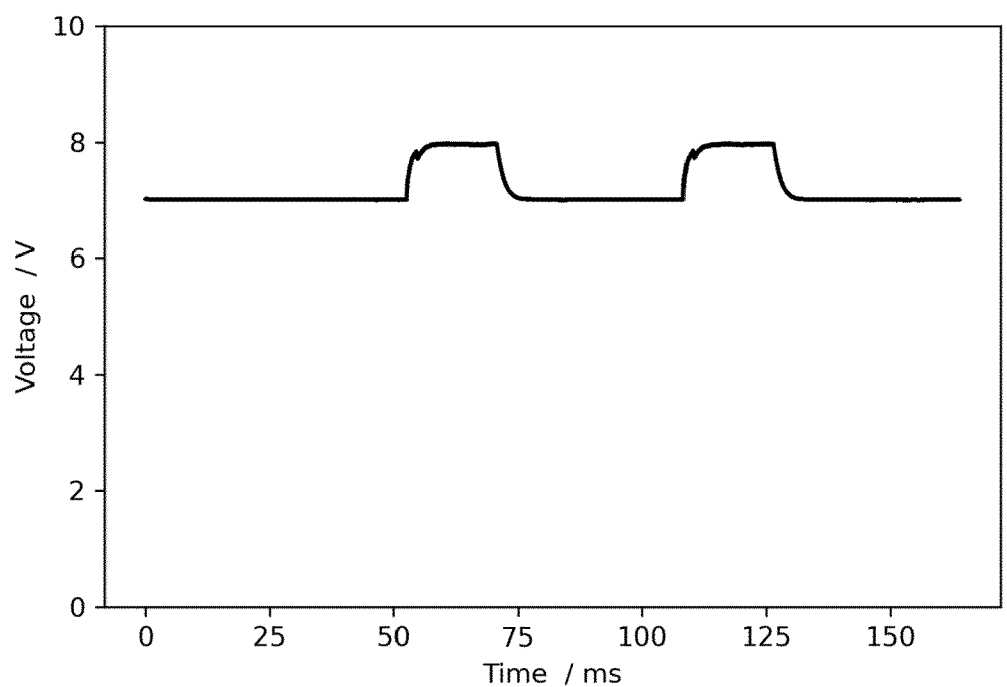
FIG. 13 illustrates an example of a supply voltage provided to a load of a wireless power receiver.
Figure 14:
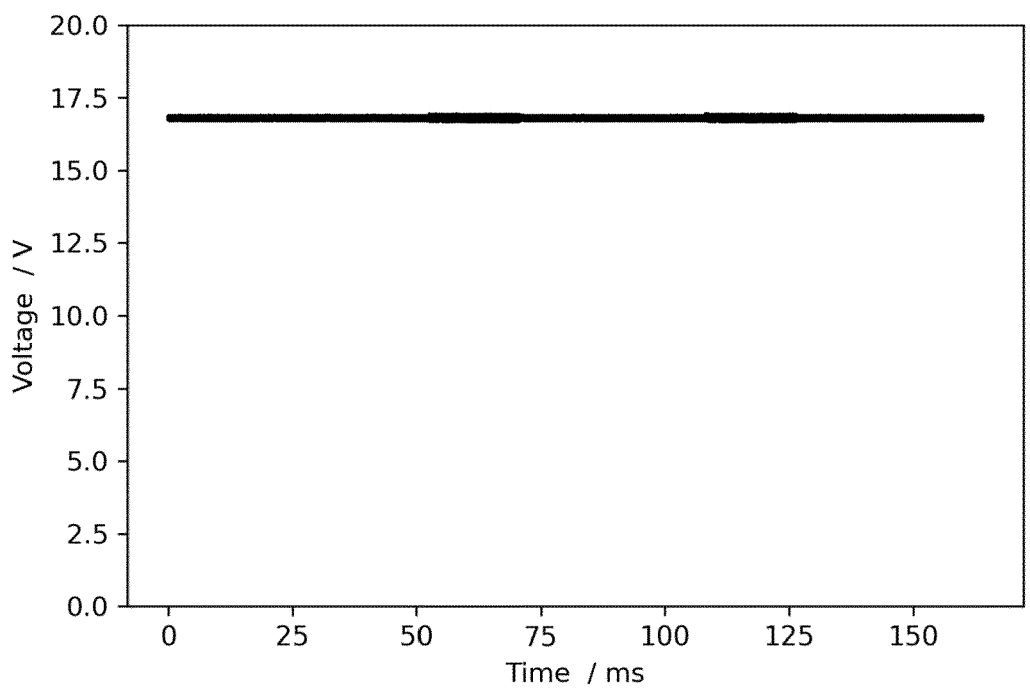
FIG. 14 illustrates an example of a supply voltage provided to a load of the wireless power receiver of FIG. 5.
Figure 15:
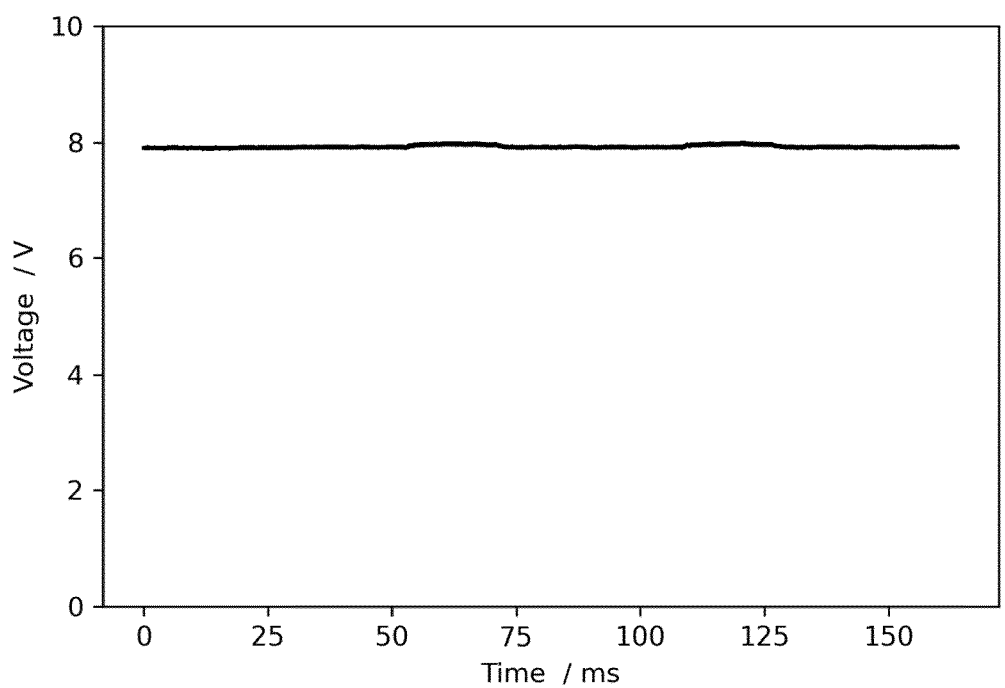
FIG. 15 illustrates an example of a supply voltage provided to a load of the wireless power receiver of FIG. 5.

FIGS. 12 and 13 illustrate the same approach as in FIGS. 7 and 8 but with the load modulation using chip sequence based load modulation having the same data rate. As can be seen, the switch noise during the communication time intervals is substantially reduced. FIGS. 14 and 15 show a corresponding result with load variations being performed during the non-communication time intervals and with these having the same statistical/average properties as during the communication time intervals. As illustrated, the voltage variations, including both the transient variations at the beginning and end of the communication time intervals as well as the switch noise during these can be reduced substantially and even in some cases be almost completely removed. A substantially improved performance is thus achieved.

When using DSSS or DDSSS type, the switching during the non-communication time intervals may thus be arranged to have properties that reflect the modulation switching during the communication time intervals. In particular, it may typically switch at least as frequently as during the communication time intervals and may on average switch the variable load to have a proportion of time at each possible load value that matches that of the communication time intervals. Typically, the data symbols and chip sequences are such that on average each possible load value is selected with the same probability/or the same proportion of time. A binary load modulation is typically such that on average the modulation loading is at one modulation loading for 50% of the time and at the other modulation loading for 50% of the time of the communication time intervals. The switching during the non-communication time intervals may also be such that each of the modulation loading values are applied for 50% of the time.

The number of load changes that the data transmitter 509 introduces during a load modulation chip sequence duration when in a non-communication time intervals may in many embodiments be at least as many as the load changes that occur in the load modulation chip sequences. Thus, for a given duration of a chip sequence, typically corresponding to a symbol time, the number of loading transitions in a non-communication time interval is at least as many as will happen (on average) during the transmissions of data symbols in the communication time intervals. Accordingly, the switching during the non-communication time intervals may be at least as frequent as the switching during the DSSS transmissions of data symbols during the communication time intervals. This may typically provide improved performance with reduced voltage variations.

The data transmitter 509 may be arranged to control the switching during the non-communication time intervals such that it does not include a modulation loading pattern that matches, or specifically is the same as, any load modulation chip sequence/modulation loading pattern for any possible data symbol value. The data transmitter 509 may specifically be arranged to avoid repeating any of the data symbol chip sequences. This may for the data receiver reduce the risk of an accidental detection and facilitating synchronization and/or detection of when the next communication time interval/data packet is received.

In many embodiments, the data transmitter 509 may be arranged control the variable load to apply a repeating loading variation pattern during the non-communication time intervals. In some embodiments, the repeating load pattern may be a pattern that has the same length as the data symbol chip sequences, but in other embodiments they may be longer or shorter.

The repeating loading variation pattern corresponds to a sequence of values of the variable load/modulation loading that are repeated during the communication time intervals. The repeating loading variation pattern may for example be chip sequence and may specifically one that has the same timing properties as the data symbol chip sequences. For example, it may have the same length and have load transitions/changes at corresponding times (e.g. the load may only change at the beginning of a communication time interval, or midway through a chip duration if differential/modulation of each chip is used). Such an approach may for example allow low complexity as effectively the same functionality may be used during the communication time intervals and the non-communication time intervals.

In many embodiments, the repeating loading variation pattern is selected to have a low cross-correlation with the modulation chip sequences that are used to modulate the data symbols on to the power transfer signal during communication time intervals. Thus, the repeating loading variation pattern may be selected to provide a clear differentiation to the modulation chip sequences and to reduce the probability that this can be confused by the data receiver. Such an approach may improve communication and facilitate e.g. detection of when a new data packet is transmitted. The continuous modulation/loading variation of the power transfer signal during the non-communication time intervals using timing parameters that match the modulation during the communication time intervals may also allow improved synchronization.

In many embodiments, the repeating loading variation pattern may be selected such that cross-correlation is close to that which would on average result when correlating the modulation chip sequences and a random sequence. A reference correlation value may be determined as an average correlation between the modulation sequence data sequences and a random sequence. Such a correlation may typically be zero if inverse data symbol values such as (−1,1) are used or may e.g. be 0.5 if data symbol values such as (1,0) are used. In such a case, the repeating loading variation pattern may be determined/selected such that a maximum absolute difference between a cross-correlation of the repeating loading variation pattern and the modulation sequence data sequences and a reference correlation is no more than 50%, 20%, 10%, or even 5% of a maximum absolute difference between an auto-correlation of the modulation sequence data sequences and the reference correlation. The repeating loading variation pattern and chip sequences may for example be binary and represented by binary values such as (1,0) or (−1,+1).

In some embodiments, the repeating loading variation pattern is a pattern periodically alternating between two modulation loadings. The variable load may be a binary switchable load and the data transmitter 509 may be arranged to alternate periodically between the two values. The switching may for example be with a periodicity equal to a symbol time (e.g. for non-DSSS communication) or to a chip time (e.g. for DSSS), or in some embodiments with a periodicity of half of these durations (e.g. for differential load modulation).

Such an approach may typically allow a low complexity implementation. It may furthermore allow fast and symmetric switching which may reduce voltage variations. Further, it may typically result in sequences that have very low correlation with modulation loading patterns, such as e.g. specifically with chip sequences used for DSSS.

In many embodiments, the repeating loading variation pattern may for example correspond to an alternating modulation of 1010101010 . . . chips or bits and/or if differential communication is used to continuous modulation of constant value chips or bits.

In some embodiments, the modulation loadings of the power transfer signal during the non-communication time intervals may be randomly generated. For example, for each new chip or bit, a random value may be determined (e.g. with 50% probability) and modulated on the power transfer signal.

The approach may provide for improved load modulation operation and specifically improved power transfer. Advantageous effects such as reduced voltage variations for the voltage provided to the load may be achieved in many scenarios. Further, the approach may also provide advantages at the power transmitter side. It may allow improved synchronization as this may be performed continuously and/or may e.g. facilitate detection of when a new data packet/communication time interval begins. It may in many embodiments also provide improved detection as more continuous load variations allow improved demodulation. For example, if an average reference level is used for demodulation, the continuous presence of load variations may provide improved determination of such a reference level and thus improved data detection.

A modulation load may be a load component of the loading of the power transfer signal/drive signal caused by/depending on/varying with the load modulation.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. The inclusion of a feature in a dependent claim of one independent claim does not imply a limitation to this independent claim but rather indicates that the feature is equally applicable to other independent claims as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example shall not be construed as limiting the scope of the claims in any way.

Generally, examples of a power receiver and a method therefore are indicated by below embodiments:

EMBODIMENT

1. A power receiver (105) for wirelessly receiving power from a power transmitter (101) via an electromagnetic power transfer signal, the power receiver (105) comprising:
an input circuit (107, 503) comprising a receiver coil (107) arranged to extract power from the power transfer signal;
a variable load (511) coupled to the input circuit and arranged to apply a modulation loading to the input circuit;
a data transmitter (509) being arranged to transmit data symbols to the power transmitter (101) by load modulating the power transfer signal during communication time intervals that are interspersed by non-communication time intervals during which no data symbols are transmitted by the data transmitter (509);
the data transmitter (509) further being arranged to vary the variable load (511) to apply a modulation loading pattern for each data symbol transmitted during the communication time intervals, each possible data symbol value being represented by a different modulation loading pattern for the modulation loading;
and
the data transmitter (509) is arranged to control the variable load (511) to repeatedly change the modulation loading during non-communication time intervals.

2. The power receiver of claim 1 wherein the data transmitter (509) is arranged to control the variable load (511) to repeatedly change the modulation loading during non-communication time intervals such that a difference between an average modulation loading during the non-communication time intervals and an average modulation loading during the non-communication time intervals differs by less than 10% of a maximum modulation loading change during the communication time intervals.

3. The power receiver of claim 1 or 2 wherein the data transmitter (509) is arranged to control the variable load (511) to repeatedly change the modulation loading during non-communication time intervals such that an average time between modulation loading changes during the non-communication time interval is no less than 50% of an average time between modulation loading changes during the non-communication time interval.

4. The power receiver of any previous claim wherein the modulation loading pattern for each possible data symbol value comprises at least two different loading values.

5. The power receiver of any previous claims 1 to 3 wherein the modulation loading pattern for each possible data symbol value comprises a load modulation chip sequence of at least five load modulation chips.

6. The power receiver of claim 5 wherein the data transmitter (509) is arranged to repeatedly change the modulation loading during non-communication time intervals such as to not include a modulation loading pattern corresponding to any load modulation chip sequence.

7. The power receiver of claim 5 or 6 wherein each chip of the load modulation chip sequence is represented by a modulation loading transition.

8. The power receiver of any of claims 5 to 7 wherein a number of modulation loading changes during a load modulation chip sequence duration in the non-communication time intervals is no less than a maximum number of modulation loading changes in the load modulation chip sequences.

9. The power receiver of any of the previous claims wherein the data transmitter (509) is arranged to control the variable load (511) to apply a repeating loading variation pattern during the non-communication time intervals.

10. The power receiver of claim 9 wherein the repeating loading variation pattern is a periodically alternation between two modulation loadings.

11. The power receiver of claim 9 or 10 as dependent on any of claims 5 to 8 wherein a maximum absolute difference between a cross-correlation of the repeating loading variation pattern and the modulation sequence data sequences and a reference correlation is no more than 50% of a maximum absolute difference between an auto-correlation of the modulation sequence data sequences and the reference correlation, the reference correlation being an average correlation between the modulation sequence data sequences and a random sequence.

12. The power receiver of any of the previous claims wherein the data transmitter (509) is arranged to control the variable load (511) to not include any modulation loading pattern representing a data symbol during non-communication time intervals.

13. The power receiver of any of the previous claims wherein the data transmitter (509) is arranged to switch the variable load (511) between two modulation loading values.

14. A wireless power transfer system comprising a power transmitter (101) and a power receiver (105) according to any of the previous claims.

15. A method of operation for a power receiver (105) wirelessly receiving power from a power transmitter (101) via an electromagnetic power transfer signal, the method comprising:
an input circuit (107, 503) comprising a receiver coil (107) extracting power from the power transfer signal;
a variable load (511) coupled to the input circuit applying a modulation loading to the input circuit (107, 503);
a data transmitter (509) transmitting data symbols to the power transmitter (101) by load modulating the power transfer signal during communication time intervals that are interspersed by non-communication time intervals during which no data symbols are transmitted by the data transmitter (509); the method further comprising:
varying the variable load to apply a modulation loading pattern for each data symbol transmitted during the communication time intervals, each possible data symbol value being represented by a different modulation loading pattern for the modulation loading;
and
controlling the variable load (511) to repeatedly change the modulation loading during non-communication time intervals.

The invention claimed is:
1. A power receiver comprising:
an input circuit,
wherein the input circuit comprises a receiver coil,
wherein the receiver coil is arranged to extract power from a power transfer signal;
a variable load coupled to the input circuit, wherein the variable load is arranged to apply a modulation loading to the input circuit; and
a data transmitter circuit,
wherein the data transmitter circuit is arranged to transmit data symbols to a power transmitter by load modulating the power transfer signal during communication time intervals,
wherein the communication time intervals are interspersed by non-communication time intervals,
wherein no data symbols are transmitted by the data transmitter circuit during the non-communication time intervals,
wherein the data transmitter circuit is arranged to vary the variable load so as to apply a modulation loading pattern for each data symbol transmitted during the communication time intervals,
wherein each possible data symbol value is represented by a different modulation loading pattern,
wherein the data transmitter circuit is arranged to control the variable load so as to apply a repeating loading variation pattern during the non-communication time intervals,
wherein a maximum absolute difference between a cross-correlation of the repeating loading variation pattern and the modulation sequence data sequences and a reference correlation is no more than 50% of a maximum absolute difference between an auto-correlation of the modulation sequence data sequences and the reference correlation, wherein the reference correlation is an average correlation between the modulation sequence data sequences and a random sequence.

2. The power receiver of claim 1, wherein a difference between an average modulation loading during the non-communication time intervals and an average modulation loading during the communication time intervals differs by less than 10% of a maximum modulation loading change during the communication time intervals.

3. The power receiver of claim 1, wherein an average time between modulation loading changes during the non-communication time interval is no less than 50% of an average time between modulation loading changes during the communication time interval.

4. The power receiver of claim 1, claim wherein the modulation loading pattern for each possible data symbol value comprises at least two different loading values.

5. The power receiver of claim 1, wherein the modulation loading pattern for each possible data symbol value comprises a load modulation chip sequence of at least five load modulation chips.

6. The power receiver of claim 5, wherein the modulation loading during non-communication time intervals does not include a modulation loading pattern corresponding to any load modulation chip sequence.

7. The power receiver of claim 5, wherein each chip of the load modulation chip sequence is represented by a modulation loading transition.

8. The power receiver of claim 5, wherein a number of modulation loading changes during a load modulation chip sequence duration in the non-communication time intervals is no less than a maximum number of modulation loading changes in the load modulation chip sequences.

9. The power receiver of claim 1, wherein the repeating loading variation pattern is a periodically changed between two modulation loadings.

10. The power receiver of claim 1, wherein the data transmitter circuit is arranged to control the variable load so as to not include any modulation loading pattern representing a data symbol during non-communication time intervals.

11. The power receiver of claim 1, wherein the data transmitter circuit is arranged to switch the variable load between two modulation loading values.

12. A method comprising:
extracting power from a power transfer signal;
transmitting data symbols to the power transmitter by load modulating the power transfer signal during communication time intervals,
wherein the communication time intervals that are interspersed by non-communication time intervals,
wherein no data symbols are transmitted during the non-communication time intervals;
varying the variable load to so as apply a modulation loading pattern for each data symbol transmitted during the communication time intervals,
wherein each possible data symbol value is represented by a different modulation loading pattern; and
controlling the variable load so as to apply a repeating loading variation pattern during the non-communication time intervals,
wherein a maximum absolute difference between a cross-correlation of the repeating loading variation pattern and the modulation sequence data sequences and a reference correlation is no more than 50% of a maximum absolute difference between an auto-correlation of the modulation sequence data sequences and the reference correlation,
wherein the reference correlation is an average correlation between the modulation sequence data sequences and a random sequence.

13. The method of claim 12, wherein a difference between an average modulation loading during the non-communication time intervals and an average modulation loading during the communication time intervals differs by less than 10% of a maximum modulation loading change during the communication time intervals.

14. The method of claim 12, wherein an average time between modulation loading changes during the non-communication time interval is no less than 50% of an average time between modulation loading changes during the communication time interval.

15. The method of claim 12, wherein the modulation loading pattern for each possible data symbol value comprises at least two different loading values.

16. The method of claim 12, wherein the modulation loading pattern for each possible data symbol value comprises a load modulation chip sequence of at least five load modulation chips.

17. The method of claim 16, wherein the modulation loading during non-communication time intervals does not include a modulation loading pattern corresponding to any load modulation chip sequence.

18. The method of claim 16, wherein each chip of the load modulation chip sequence is represented by a modulation loading transition.

19. The method of claim 16, wherein a number of modulation loading changes during a load modulation chip sequence duration in the non-communication time intervals is no less than a maximum number of modulation loading changes in the load modulation chip sequences.

20. The method of claim 12, wherein the repeating loading variation pattern is periodically changed between two modulation loadings.

21. The method of claim 12, further comprising controlling the variable load so as to not include any modulation loading pattern representing a data symbol during non-communication time intervals.

22. The method of claim 12, further comprising switching the variable load between two modulation loading values.

23. A computer program stored on a non-transitory medium, wherein the computer program when executed on a processor performs the method as claimed in claim 13.

* * * * *